United States Patent [19]

Melpolder et al.

[11] Patent Number: 5,308,687
[45] Date of Patent: May 3, 1994

[54] FIBER ELEMENT CONTAINING TIN OXIDE HETEROPOLYCONDENSATES WITH ENHANCED ELECTRICAL CONDUCTIVITY

[75] Inventors: Sharon M. Melpolder, Hilton; Bradley K. Coltrain, Fairport; Sylvia A. Gardner, Rochester, all of N.Y.

[73] Assignee: Eastman Kodak Company, Rochester, N.Y.

[21] Appl. No.: 112,868

[22] Filed: Aug. 26, 1993

Related U.S. Application Data

[63] Continuation of Ser. No. 918,879, Jul. 22, 1992, abandoned, which is a continuation of Ser. No. 640,754, Jan. 14, 1991, abandoned, which is a continuation of Ser. No. 349,458, May 9, 1989, abandoned.

[51] Int. Cl.$^5$ ............................................. B32B 9/04
[52] U.S. Cl. .................................... 428/411.1; 423/593; 252/501.1; 252/518; 430/527; 430/530; 501/12; 556/81; 556/105
[58] Field of Search .................... 428/411.1; 423/533; 501/12; 556/81, 105; 252/501.1, 518; 430/527, 530

[56] References Cited

U.S. PATENT DOCUMENTS

| | | |
|---|---|---|
| 2,772,190 | 11/1956 | Haayman et al. |
| 3,676,362 | 7/1972 | Yates |
| 4,078,935 | 3/1978 | Nakagiki et al. ............ 430/527 |
| 4,203,769 | 5/1980 | Guestaux |
| 4,394,441 | 7/1983 | Kawaguchi et al. ......... 430/527 |
| 4,452,830 | 6/1984 | Yoshizumi |
| 4,495,276 | 1/1985 | Takimoto et al. ........... 430/527 |
| 4,534,280 | 4/1986 | Nanao et al. ............... 501/12 |
| 4,584,280 | 4/1986 | Nanao et al. ............... 501/12 |
| 4,594,182 | 6/1986 | Hashimoto et al. |
| 4,837,135 | 1/1989 | Milner ...................... 430/427 |

FOREIGN PATENT DOCUMENTS

| | | |
|---|---|---|
| 5915 | of 1970 | Japan |
| 80/35428 | 9/1978 | Japan |
| 5682504 | of 1981 | Japan |
| 2094013 | 12/1981 | United Kingdom |

OTHER PUBLICATIONS

C. J. R. Gonzalez-Oliver, Journal of Non-Crystalline Solids 82, "Sn(Sb)-Oxide Sol-Gel Coatings on Glass," (1986), pp. 400–410.

Primary Examiner—Jack P. Brammer
Attorney, Agent, or Firm—David F. Janci

[57] ABSTRACT

Metal oxide heteropolycondensates of tin and boron, particularly heteropolycondensates of this type wherein the major amount of the metal oxide is tin oxide, and a minor amount is boron oxide. The quantity of boron oxide is sufficient to enhance the conductivity of the composition.

4 Claims, No Drawings

FIBER ELEMENT CONTAINING TIN OXIDE HETEROPOLYCONDENSATES WITH ENHANCED ELECTRICAL CONDUCTIVITY

This is a continuation of application Ser. No. 07/918,879, filed Jul. 22, 1992, now abandoned, which was a continuation of application Ser. No. 07/640,754, filed Jan. 14, 1991, now abandoned which was a continuation of application Ser. No. 07/349,458, filed May 9, 1989, now abandoned.

FIELD OF THE INVENTION

This invention relates to tin oxide compositions with improved electrical conductivity, as measured by decreased resistivity. More specifically, it relates to tin oxide heteropolycondensates that contain a conductivity improving (resistivity reducing) amount of boron oxide. The compositions of this invention are non-colloidal, i.e. they are not composed of discrete colloidal particles. The compositions of this invention are made by a sol-gel technique conducted in an organic solvent. Stated another way, the heteropolycondensate networks of this invention are produced by a solution sol-gel process; the solvent employed being selected from organic solvents. The sol-gel process employed in this invention comprises a polymerization. The networks produced are prepared in solution.

This invention also provides antistatic coatings produced from the compositions of this invention. Furthermore, this invention provides a low temperature process for producing electrostatic coatings. This process can be used to prepare coatings on plastic, paper, and other similar substrates which are susceptible to degradation by high temperatures. High temperatures are commonly employed in the prior art for producing tin oxide coatings. Hence, the coating process of this invention has a decided advantage over such prior art processes.

BACKGROUND OF THE INVENTION

Tin oxide coatings have been applied to glass to make it more antistatic. For example, such coatings have been applied to the surface of cathode ray tubes and similar devices, where the buildup of static charges is undesirable. Antistatic coatings combat the accumulation of dust on surfaces where dust impairs the function of the article.

Antistatic coatings are useful in other arts as well. For example, it is well known that numerous types of photographic film supports have the tendency to produce charges of static electricity during winding and unwinding, and that these charges do not easily dissipate, because the materials that are used as film supports usually are poor electrical conductors. High potentials that have been created in this manner, may discharge suddenly in the course of manufacture or in the course of utilization of the product by the user, causing flashes of light from static electricity and an undesirable recording of the static electricity discharge on a radiation-sensitive layer, such as a layer of photographic emulsion. In order to avoid this result, it is customary in the prior art to apply to the backing of the film support an electrically conductive layer, also referred to as an antistatic layer, to facilitate the dissipation of the static charges, and thus avoid the sudden discharges and the resulting light flashes which otherwise would damage the radiation-sensitive layer. The antistatic coating need not be applied to the backing of the film support, as stated above. Alternatively, it may be applied in a subbing layer or in a conductive overcoat (COC).

Known antistatic layers generally consist of a binder in which is%dispersed an organic or inorganic conductive substance to render the surface on which the layer is coated, for example, a film support, sufficiently conductive to make possible the flow of the electrostatic charges to a discharge means. Most often, antistatic layers are more or less hygroscopic layers, the efficiencies of which vary as a function of the degree of humidity in the air. Some layers may not be very suitable for use under conditions of low relative humidity because they are no longer sufficiently conductive. Likewise, some hygroscopic layers are not very suitable at conditions of high humidity because they become sticky. It is difficult to separate them from the surfaces to which they adhere. The effort that is necessary to separate two superimposed, layers, for example, sometimes creates charges higher than those that would appear in the absence of any antistatic layer.

An object of this invention is to provide a tin oxide composition that has enhanced electroconductive properties. Another object is to provide antistatic coatings produced from the compositions of this invention. Still another object is go provide a low temperature method for producing antistatic coatings.

These objects have been satisfied by providing a composition which comprises tin oxide and boron oxide covalently bound in a polymeric network. These compositions are made in organic solvent solution by a process which does not produce a colloid, but which provides a solution of the inorganic polymer or oligomer. The solution can be used to prepare a coating on a substrate, i.e. the organic solvent can be used as a vehicle for spreading the polymer on the surface to be coated. The solvent can be readily removed by vaporization at low temperature. After solvent removal, the coating, film or layer is transparent, and provides antistatic properties to the surface or substrate being treated.

The coating process of this invention is inexpensive, and readily carried out without the need for costly machinery. Furthermore, it has been found that it is not necessary to cure the coating at elevated temperatures greater than about 150° C. to reduce electrical resistivity. This finding, and the degree of antistatic property conferred by the coating, were entirely unexpected.

RELATED ART

U.S. Pat. No. 4,203,769 to Claude Guestaux, and assigned to Eastman Kodak Company, describes a vanadium pentoxide composition for use with photographic film or paper, and other radiation sensitive articles. The most preferred composition contains 100% $V_2O_5$. In that invention, it was found that as soon as the amount by weight of amorphous $V_2O_5$ in the antistatic material reaches and surpasses about 90%, a colloidal solution of $V_2O_5$ is obtained with an unusually high content of $V_2O_5$, so that it is possible to obtain high antistatic properties, e.g. high conductivity, with a lower deposited quantity of the antistatic material than is needed when a lesser amount of amorphous $V_2O_5$ is present.

U.S. Pat. No. 3,676,362 describes the preparation of $Sb_2O_3$, $SnO_2$, $TiO_2$ and $ZrO_2$ by a sol-gel technique. The inorganic oxides are incorporated into polymers to provide flame resistance and other desirable properties.

U.S. Pat. No. 4,452,830 describes an electro-conductive composition comprising a dispersion of titanium oxide particles having a coating layer of antimony-containing tin oxide.

U.S. Pat. No. 4,594,182 describes indium-containing tin oxide compositions for forming a transparent conductive film.

U.S. Pat. No. 2,772,190 teaches that the electrical conductivity of tin oxide films is enhanced with antimony and by phosphorous compounds Japanese Kokoku No. Sho 45 (1970) - 5915 pertains to treatment of synthetic resins to make them antistatic. The compounds used are selected from stannous alkoxides and stannous acylates. These compounds hydrolyze under the influence of oxygen to tetravalent tin moieties which form polymers:

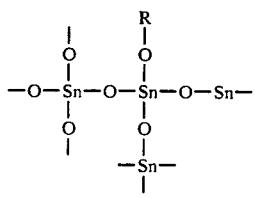

Gonzales-Oliver et al, J. of Non-Crystalline Solids 82(1986) 400-410 describes electroconductive antimony doped tin oxide coatings prepared by dip-coating and spray-coating techniques.

Japanese Kokai 56-82504 discloses use of colloidal tin oxide in the preparation of electrically conductive transparent film. The colloidal oxide is coated on the substrate and processed by using a gas plasma which contains oxygen. The tin oxide colloid can be doped with a Group III B element, for example, aluminum, gallium, indium, tellurium, or an element in Group VB, for example, arsenic, antimony or bismuth.

In contrast, Applicants' materials are not colloids, but three dimensional metal oxide networks. Furthermore, Applicants' materials are not made by doping a finished material with an element. Instead, the present invention provides composites containing tin oxide and boron oxide prepared from a reaction mixture which contains tin and boron compounds, so that the oxides in the finished product are covalently bound and intermixed i.e. randomly copolymerized. In other words the boron oxide is not solely on the surface of a particle of tin oxide.

SUMMARY OF THE INVENTION

This invention provides tin oxide containing an electroconductive improving amount of boron oxide. (For brevity the term "conductive" is sometimes used as a synonym for "electroconductive" in the description of this invention.) The compositions of this invention are prepared by a sol-gel technique. Thus, the compositions of this invention are prepared by a process which comprises the hydrolysis and condensation of a mixture of hydrolyzable tin and boron compounds. The mixture may comprise, for example, a tin tetrahalide and a boron alkoxide.

The compositions of this invention may be used to prepare antistatic coatings that are transparent. Such coatings or layers may be used to coat glass and plastic articles to give them a conductive surface. Such surfaces are less susceptible to the accumulation of undesired dust particles, which detract from the usefulness or aesthetic characteristics of the article. The surface is also less susceptible to the build-up of unwanted electrostatic charges.

The antistatic coatings, films and layers of this invention can be produced by a low temperature technique. Hence, the materials of this invention can be used to coat plastics and other substrates susceptible to the high temperatures commonly used in the art for making antistatic tin oxide coatings.

Preferred articles coated with antistatic layers of this invention are photographic film and paper, and similar radiation sensitive materials.

The coating processes that are used to apply the antistatic composition of this invention to such substrates may be roll coating processes which comprise using a wetting cylinder or roll, partly immersed in the solution to be applied, and a cylinder or roll around which moves the film support to be processed, creating between them a solution meniscus that the film support impinges against, resulting in a coating on at least one surface. However, one may use any of the conventional coating processes, such as hopper coating, with removal of the excess quantity by means of an "air knife", brush coating, and other techniques used in the coating arts.

The quantity of antistatic composition which can be applied to the supports may vary considerably. The coverage may vary from .0.1 mg/m² to 300 mg/m², but it can be higher, for example up to 6 g/m², if necessary. In photographic products, the antistatic composition is applied preferably at from about 1 to about 200 mg/m².

The antistatic layer may occupy various positions in the products to be treated, for example, it can be a backing layer, or a sublayer. In photographic products, the antistatic layer is generally a backing layer, subbing layer or COC.

In order to improve the mechanical properties of the layers, and particularly the friction coefficient, it is contemplated that one may provide a layer containing a compound that imparts the desired property, e.g., a lubricant such as carnauba wax. One may also apply a protective layer containing a cellulose derivative, e.g., cellulose acetobutyrate.

It is possible to apply to the antistatic layer to the two previously mentioned layers, or else a single layer containing both the binder and the lubricant. The antistatic layer retains, however, its conductive properties.

The antistatic layers obtained from the composition according to the invention may have a permanent or temporary character, depending on the use that is intended for the treated products. An advantage of the antistatic composition made according to this invention is that antistatic layers prepared from them, and which are made to be a permanent part of a coating on a support, such as in a radiation-sensitive, e.g., photographic product, remain conductive even after development and processing of the product through processing solutions and equipment.

Above it was stated that this invention provided a process in which an antistatic coating could be produced at a low temperature. This provides important advantages in coating materials such as photographic film and plastic articles. It is to be understood however, that the compositions of this invention can also be produced at conventional higher temperatures, if desired. Such higher temperatures may be used when preparing a coating of this invention on a substrate such as glass.

DESCRIPTION OF PREFERRED EMBODIMENTS

This invention provides compositions comprising a tin oxide and a boron oxide which may contain residual hydrolyzable and/or not fully condensed species. More particularly, this invention provides a tin oxide containing a conductivity improving, i.e. resistance reducing, amount of a boron oxide produced by a sol-gel process.

The compositions of this invention comprise tin oxide and boron oxide heteropolycondensates in which the boron oxide is present in a conductivity improving amount. In typical compositions the boron oxide composition is from about one to thirty mole percent, more preferably from about two to about twenty mole percent. However it is to be understood that materials having boron oxide contents somewhat outside this range are within the scope of this invention.

Compositions of this invention form films or layers which are optically clear, i.e. transparent. It is believed that the optical clarity is due to the homogeneity of the compositions of the invention. In other words, from the transparency of the compositions it is believed that they are substantially free of heterogeneous particles and immiscible domains which are of a size sufficient to scatter visible light.

Compositions of this invention are produced by a sol-gel process. By this method, the boron oxide moieties and the tin oxide moieties in the compositions can be bonded together in a network. Thus, this invention provides non-colloidal particles in which the boron oxide is not merely concentrated on the surface of discrete tin oxide particles. In other words, the compositions of this invention comprise boron and tin species linked by bridging oxygens. Some of the novel materials are believed to be non-fully condensed oxides, since they are produced by a low temperature process.

This invention also provides a novel process for producing an electrostatic coating, film or layer. In a highly preferred embodiment, this invention comprises a low temperature process for forming a non-colloid derived antistat coating on a substrate, said process comprising (i) forming a tin oxide sol-gel containing from about one to about thirty mole percent boron oxide, by subjecting a mixture of a hydrolyzable tin compound and a hydrolyzable boron oxide compound in an organic solvent to hydrolysis/condensation using a substantially stoichoimetric amount of water, thereby forming a heteropolycondensate network of boron oxide and tin oxide species wherein the boron oxide is covalently bound in said network and (ii) subsequently applying the solution of said heteropolycondensate thereby produced to a substrate and then removing said solvent at a temperature between about 50° C. and about 150° C. to form an antistatic layer on said substrate.

As stated above, the compositions of this invention are made from tin and boron compounds which yield tin oxide and boron oxide moieties (which may include not fully condensed or hydrolyzed species of either element, as mentioned above) when reacted under the process conditions employed. Thus, the compositions of this invention are prepared from reaction mixtures that comprise a hydrolyzable tin compound. For this invention, tin tetrahalides, e.g. compounds having the formula $SnX_4$ wherein X is a halogen, may be used. A preferred tetrahalide is tin tetrachloride.

One may also use stannic alkoxides and stannic acylates to prepare the heteropolycondensates of this invention. These materials have the formulas:

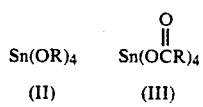

$$Sn(OR)_4 \quad Sn(OCR)_4$$
$$(II) \quad\quad (III)$$

As shown by the example, good results are obtained when a tetravalent tin compound is employed. These results suggest, in light of the teachings of Japanese Kokoku No. 45-5915, supra, that stannous alkoxides and acylates may also be useful in this invention. If employed, these compounds may be reacted in the presence of oxygen, air, or oxygen enriched air so that tin in a tetravalent state is produced.

It is preferred that these starting materials contain lower acyl and lower alkoxy groups, i.e. acyl and alkoxy groups which have up to about six carbon atoms. Thus, the groups represented by R in formulas (II) and (III) are organic groups, preferably groups solely composed of carbon and hydrogen, and most preferably alkyl radicals of from one to about six carbon atoms, and such alkyl radicals substituted with ether linkages. With regard to the latter type of compound a preferred example is a radical having the formula $-OCH_2CH_2-OCH_2CH_2OCH_3$. This type of radical may be derived by reacting stannic halide in the presence of methoxyethoxyethanol.

Higher acyl and alkoxy groups can be present in the starting materials used in this invention. For example, one may select a group having more than six carbons in order to have a reactant which is more soluble in an organic solvent of choice, or because a slower hydrolysis rate is desired.

Other hydrolyzable tin compounds can be used to prepare the antistatic compositions of this invention. Thus, one may use any tin compounds which will hydrolyze within a reasonable time, i.e. at about the same rate as the tin compounds mentioned above, when contacted with water at a temperature of from about $-20°$ C. to about 130° C. A skilled practitioner can readily elucidate whether a compound is suitable for this invention by simple experimentation, conducted to determine the rate of hydrolysis.

With further reference to the starting tin compounds, the tin tetrahalides form corrosive by-products upon hydrolysis or alcoholysis. The by-products from tin alkoxides are not so corrosive. However, the alkoxides may not be as readily available, or may cost more than tin tetrachloride, for example. Moreover, the alkoxides can be readily formed from the tetrahalide by addition of the appropriate alcohol. Furthermore, the alkoxides may not hydrolyze as readily as the halides. Moreover, tin alkoxides with smaller alkoxy groups generally hydrolyze faster than those with larger alkoxy groups. A practitioner may wish to consider these comparative points when selecting the tin compound (or compounds) for use in this invention.

As taught above, the compositions of this invention are prepared in part from a boron compound that can form a boron oxide by hydrolysis and condensation. Typical boron compounds that can be used as starting materials in this invention are the borates. Preferably, these are derivatives of lower alcohols. In other words, it is preferred that the boron compounds be selected from borates having the formula:

B(OR)₃ wherein OR is a lower alkoxy group as discussed above. It is to be understood however, that although it is preferred that the groups represented by R contain up to six carbon atoms, that borates with larger groups can also be used in this invention. Other types of boron compounds suitable for use in this invention can be readily ascertained by a skilled practitioner using a simple experiment to determine the hydrolysis rate. If such compounds hydrolyze about as fast as the borates they may be used in this invention.

The mixed oxide heteropolycondensates of this invention can be prepared from a mixture of one or more tin and one or more boron compounds of the types discussed above. The relative amounts are selected so that the boron content of the product increases the electroconductivity of the product. As stated above, the amount of boron oxide (calculated as $B_2O_3$) is generally in the range of from about one to about thirty mole percent.

As already indicated, the heteropolycondensates of this invention are made by a sol-gel process. Generally speaking, the tin and boron compounds are initially co-mixed, i.e. co-polymerized in the substantial absence of water, and in the presence of one or more organic solvents in which the process is to be carried out. Alternatively the condensates of this invention can be made by a two-step reaction. More specifically, the boron source and the tin source can be initially reacted separately to prepare low molecular weight oligomers, which are subsequently mixed and co-reacted to form a type of block copolymer. One may also blend two pre-polymers to prepare a blend rather than a copolymerized system.

Solvents which can be used preferably dissolve or are miscible with the tin and boron compounds, and are miscible with the amount of water used in the hydrolysis. Solvents of this type include tetrahydrofuran, acetone, methoxyethoxyethanol, methoxyethanol, ethylene glycol, methyl cellosolve, mixtures thereof, and the like. Applicable solvents include alcohols that correspond to the alkoxy groups in the tin and/or boron compounds employed. Thus, the applicable solvents include alcohols which have from one to about six carbon atoms, e.g. methanol, ethanol, n-hexanol, and the like.

Solvent quantities of the solvent are employed. One uses enough solvent to dissolve the metal compounds used to produce the binary metal oxides in the heteropolycondensate. It is within the skill of a practitioner having ordinary skill in the art to determine the amount of solvent to employ. As shown by the Example which follows, the amount of solvent may be from 2 to 6 times the volume of a liquid reactant. Greater or lesser amounts of solvent can be used. When a solid reactant is employed as a starting material, an analogous amount of solvent can be used. The amount of solvent employed will depend to some extent on the thickness of the product coating desired, and the viscosity of the polymer being coated on the substrate.

As shown by the Example, good results are obtained when methoxyethoxy ethanol is employed as a reaction medium. Accordingly this substance and others which have the same properties are highly preferred as reaction solvents.

To conduct the sol-gel process, the compounds to be reacted are admixed with water under reaction conditions. For this purpose, the amount of water is about the amount required to hydrolyze the hydrolyzable groups in the tin and boron compounds used as starting materials. Thus for example, if a tin tetrahalide is used, four moles of water are required for each mole of tin tetrahalide. For each mole of trialkoxy borate employed, three moles of water are required.

The amounts of water discussed above are the stoichiometric amounts, i.e. the amounts of water required by the balanced chemical equations depicting the process. It is not required that an exact stoichiometric amount be employed. Thus, for the process of this invention a "substantially stoichiometric amount" of water can be used. As used herein a "substantially stoichiometric amount" is the stoichiometric amount plus or minus the amount of water within ordinary processing error. Therefore, under most circumstances, a substantially stoichiometric amount of water is the stoichiometric amount plus or minus 10 mole percent.

When calculating the stoichiometric amount, the amount of water formed by condensation reactions in the sol-gel process is ignored.

The sol-gel process comprises condensation reactions as well as hydrolysis reactions. This combination of reactions is depicted for tin in the above-cited Japanese Kokoku 45-5915 as follows:

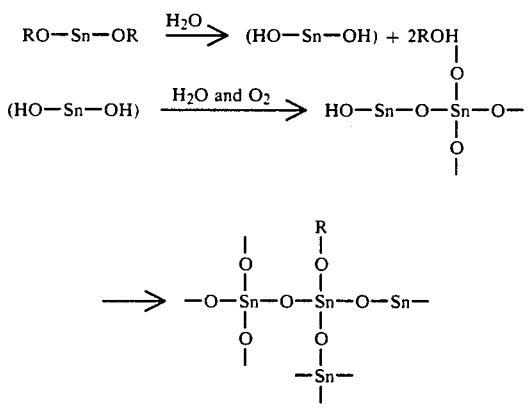

An analogous hydrolysis/condensation process takes place with the boron compounds employed as starting materials in this invention. In this way, the boron and tin species (which contain —OH groups) interact by condensation to form a mixed heteropolycondensate which contains both tin oxide and boron oxide moieties. It will be recognized by a skilled practioner that each boron atom will be linked in the substrate by three bridging oxygens, —O—. For some products it is believed that the boron oxide moieties are randomly dispersed among the tin oxide groups; however all that is necessary is that the boron-containing moieties confer an increase in electroconductivity.

The hydrolysis/condensation process is conducted at any convenient temperature which gives the desired results. Generally, the process is conducted at a temperature between about −20° C. and about 130° C. More preferably, the process is conducted at a temperature between about 0° C. and about 70° C. Reaction temperatures at or about ambient temperature are highly preferred.

The process is generally conducted in at one temperature until hydrolysis and condensation is essentially complete. If desired, more than one temperature can be used. The temperature selected will be determined at least to some extent by the reactivity of the reactants employed, and the relative amounts of tin and boron reactants used.

The process can be conducted at any convenient pressure. Atmospheric pressure is preferred; however one may employ a sub-atmospheric pressure, if desired, to assist driving off solvent and other volatiles present. Also, a super atmospheric pressure may be employed; however such pressures ordinarily do not offer any material advantage.

The process time is not a truly independent variable, but is dependent to an appreciable extent on the other reaction variables employed, such as the reaction temperature, and the inherent reactivity of the starting materials. In general, the process can be conducted in about 0.25 to about 24 hours.

Above, it was stated that the process can be conducted in one stage until condensation is complete. However, it is not necessary that the process be conducted in this manner. For example, the process may be carried out in two stages; first, a precondensation of one or more reactants until a desired amount of condensation occurs, followed by a completion of the condensation after admixing the reactants. As stated above, the process can be conducted by blending two polymers. In these embodiments where separate process steps are used, the separate steps can be conducted using the same or different reaction conditions.

The process may be conducted at more than one reaction temperature. For example much of the hydrolysis/condensation can be conducted at ambient temperature, or thereabouts, followed by a finishing step conducted at a temperature that is somewhat higher, such as temperature within the range of from about 50° C. to about 150° C. Further discussion of the temperatures used in this invention is set forth after the Example which follows.

EXAMPLE (A) Tin tetrachloride (20 ml, 0.17 mole) and 50 ml of methoxyethoxyethanol were stirred for 30 minutes at ambient temperature. Thereafter 12.3 ml of water (0.68) mole was added slowly and mixed at ambient temperature for 30 minutes and the resultant mass heated for two hours at 60° C., using a constant temperature bath. The result is a highly viscous sol-gel solution of tin oxide, i.e. a tin oxide heteropolycondensate.

(B) Tin tetrachloride (20 ml, 0.17 mole) and 100 ml of methoxyethoxyethanol were stirred at ambient temperature for 30 minutes. To the stirred mixture was added 0.5 ml (0.0044 mole) of trimethyl borate; the resultant mixture was stirred for an additional 15 minutes at room temperature. Thereafter, 12.5 ml of $H_2O$ (1 mole of water per mole of hydrolyzable group) in 25 ml of methoxyethoxyethanol was added very slowly, and the reaction mixture stirred for an additional 10 minutes at ambient temperature. The product was a mixed tin oxide, boron oxide heteropolycondensate.

(C) Samples of the products of (A) and (B) were knife coated on subbed Estar film on a 43° C. heated block using a 0.5 mil Bird blade. The films were heated in an oven at 75° C. for 15 minutes. The resulting sheets were transparent. The resistivity of the sheets was measured using standard techniques by balancing areas of the sheet between test electrodes against standard resistances.

Results were as follows:

| Resistivity Measurements | |
|---|---|
| Sample | Sheet Resistivities Ohms per square @ 49% relative humidity |
| tin oxide sol-gel (A) | $10^{13}$ |
| tin oxide-boron oxide sol-gel (B) | $10^9$ |

As shown, the electroconductivity of the product of this invention (B) was markedly superior to the comparative material.

As pointed out in above-cited Japanese Kokai 56-82504, there are problems associated with the preparation of prior art antistatic layers. For example, some methods are based on vacuum deposition, or on sputtering techniques. Some prior art methods require heating the film in the presence of air to a temperature in the range of 400°-600° C. or higher. Such techniques are generally inappropriate for use with substrates such as plastic, which are degraded by such temperatures.

In contrast with the prior art methods discussed above, the process of this invention does not require expensive equipment for vacuum deposition or sputtering, and it does not require high temperatures.

With regard to temperature, the following further elucidates the unexpected results obtained with this invention. As stated in the Example, an undoped tin oxide sol-gel film prepared by heating in air at 75° C. had a sheet resistivity in ohms per square of $10^{13}$. Upon heating in air at 500° C., the sheet resistivity was reduced to $10^{11}$. In contrast, the film of this invention produced by the procedure of the above example had a much better resistivity, $10^9$, even when no highly elevated temperature was employed, as with the pure tin oxide layer. Processing at elevated temperatures i.e. 450°-500° C. in air, oxygen or inert gas (e.g. argon) atmosphere will further improve the conductivity of the product of this invention. For example heating in oxygen for one hour at 450° C. reduced the resistivity to $10^5$ ohms per square. The undoped tin heated in argon at 450° C. for one hour had a resultant resistivity of $10^4$ ohms per square.

Other products of this invention are made from mixtures of a tin tetrahalide or a tin acylate or alkoxide of the types described and illustrated above, and a borate of the type defined and illustrated above. The mixtures are formulated such that the boron oxide content of the products are from about one to about 30 mole percent. The mixtures are hydrolyzed and condensed using a substantially stoichiometric quantity of water, and in the presence of an organic solvent of the types set forth above. The hydrolysis/condensation is conducted in the presence of air or oxygen, using a reaction temperature of from about −20° C., to about 130° C. for from about 15 minutes to about 24 hours; such that the longer times are used with the higher reaction temperatures.

Coatings, films, or layers of the resultant mixed tin oxide, boron oxide heteropolycondensates are prepared as described above. They can also be prepared by spray coating, spin coating, and dip coating as described in Gonzales-Oliver supra, and by similar techniques.

The nature of the substrate to which a coating, film or layer of the antistatic composition of this invention is applied is not critical. Glass, plastic, paper and other non-conductive surfaces may be treated. As an example of plastics which may be treated, one may cite, e.g. cellulose derivatives, such as cellulose acetate, cellulose acetobutyrate cellulose acetate phthalate, cellulose terephthalate, methylcellulose, polyvinyl alcohols, soluble polyamides, styrene and maleic anhydride copolymers, copolymers prepared in emulsion, such as the copolymer of methlacrylate, vinylidene chloride and itaconic acid, modified polyesters and the like.

The concentration of the tin oxide boron oxide heteropolycondensate in the solution used for coating can vary within wide limits. Generally speaking, it will be from about 0.5 to 50 weight percent. Greater or lesser concentrations can be employed if desired.

The antistatic layers of this invention, will be particularly useful in the manufacture of photographic and cinematographic films. Another field of application of the antistatic layers, according to the invention, is magnetic recording, wherein one uses magnetic tapes. One may apply during manufacture thereof an antistatic layer containing the antistatic composition of this invention to remove charges due to the friction of the tape in the various apparatus in which they can be used. One may also use the antistatic compositions, according to the invention, in electrophotographic products. One may apply them to the preparation of antistatic fibers and filaments and to wrapping products, such as those used with radiographic products.

This invention has been described in detail in particular reference to preferred embodiments. A skilled practitioner familiar with the above detailed description can make many modifications or changes without departing from the scope or spirit of the appended claims.

What is claimed is:

1. A film comprising a substrate susceptible to degradation at a temperature of 400° C. having a transparent antistatic layer thereon comprising a sol-gel process derived heteropolycondensate having tin oxide and boron oxide in a three dimensional metal oxide network, in which tin oxide and boron oxide moieties are bonded together by bridging oxygens, and the boron oxide content is from about one to about thirty mole percent, said heteropolycondensate being further characterized by a process comprising subjecting a mixture of a hydrolyzable tin compound and a hydrolyzable boron compound, wherein the boron compound is in an amount of from about one to about thirty mole percent, to hydrolysis/condensation in an organic solvent using a stoichiometric or substantially stoichiometric amount of water, thereby forming a solution of said heteropolycondensate; and subsequently applying said solution of said condensate to said substrate, and removing the solvent at a temperature of from about 50° C. to about 150° C. to form said transparent antistatic layer of said heteropolycondensate on said substrate without subjecting said antistatic layer to temperatures exceeding about 400° C. in said process; said film being characterized by having a reduced resistivity conferred by said transparent antistatic layer formed at said temperature.

2. Film of claim 1 wherein the coverage of said antistatic layer is from 0.1 mg/m$^2$ to 300 mg/m$^2$.

3. Film of claim 1 wherein the coverage of aid antistatic layer is from about 1 to about 200 mg/m$^2$.

4. Film of claim 1 having a sheet resistivity in ohms per square at 48% relative humidity of $10^9$.

* * * * *